United States Patent
Wang et al.

(10) Patent No.: US 11,212,176 B2
(45) Date of Patent: *Dec. 28, 2021

(54) CONSISTENT PROCESSING OF TRANSPORT NODE NETWORK DATA IN A PHYSICAL SHARDING ARCHITECTURE

(71) Applicant: Nicira, Inc., Palo Alto, CA (US)

(72) Inventors: Ziyou Wang, Beijing (CN); Jianjun Shen, Beijing (CN); Pankaj Thakkar, Cupertino, CA (US); Hua Wang, Basking Ridge, NJ (US); Donghai Han, Beijing (CN)

(73) Assignee: Nicira, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,521

(22) Filed: Oct. 1, 2019

(65) Prior Publication Data

US 2020/0036583 A1 Jan. 30, 2020

Related U.S. Application Data

(63) Continuation of application No. 15/422,905, filed on Feb. 2, 2017, now Pat. No. 10,447,535.

(51) Int. Cl.
*H04L 12/24* (2006.01)

(52) U.S. Cl.
CPC ........ *H04L 41/082* (2013.01); *H04L 41/0853* (2013.01); *H04L 41/12* (2013.01)

(58) Field of Classification Search
CPC ............... H04L 41/082; H04L 41/0853; H04L 41/0866; H04W 60/04; H04W 64/00; H04W 72/02; H04W 72/0406
See application file for complete search history.

(56) References Cited

U.S. PATENT DOCUMENTS

| 7,739,677 | B1 | 6/2010 | Kekre et al. |
| 10,050,870 | B2 | 8/2018 | Reddy et al. |
| 2013/0028091 | A1* | 1/2013 | Sun ..................... H04L 41/0896 370/236 |

(Continued)

OTHER PUBLICATIONS

RFC 7665, "Service Chaining (SFC) Architecture", IETF, Oct. 2015.

*Primary Examiner* — Romani Ohri
(74) *Attorney, Agent, or Firm* — Patterson & Sheridan, LLP (57) ABSTRACT

Certain embodiments described herein are generally directed to consistent processing of transport node network configuration data in a physical sharding architecture. For example, in some embodiments a first central control plane (CCP) node of a plurality of CCP nodes determines a sharding table, which is shared by the plurality of CCP nodes. In certain embodiments, the first CCP node determines a connection establishment between a first transport node and the first CCP node. In some embodiments, if the first CCP node determines, based on the sharding table, that it is a physical master of the first transport node, the first CCP node receives network configuration data from the first transport node, stores at least a portion of the network configuration data, and transmits a data update comprising at least a portion of the network configuration data to a shared data store accessible by the plurality of CCP nodes.

21 Claims, 6 Drawing Sheets

(56) References Cited

U.S. PATENT DOCUMENTS

| | | | |
|---|---|---|---|
| 2013/0103817 A1* | 4/2013 | Koponen | G06F 9/45558 |
| | | | 709/223 |
| 2015/0188978 A1* | 7/2015 | Petculescu | H04L 67/02 |
| | | | 709/217 |
| 2015/0215788 A1* | 7/2015 | Liu | H04W 12/06 |
| | | | 726/3 |
| 2015/0229715 A1* | 8/2015 | Sankar | G06Q 10/083 |
| | | | 709/203 |
| 2017/0013058 A1* | 1/2017 | Annamalai | H04L 67/1095 |
| 2017/0041801 A1* | 2/2017 | Liu | H04W 16/10 |
| 2017/0295021 A1 | 10/2017 | Aranda Gutierrez et al. | |
| 2017/0310611 A1 | 10/2017 | Kumar et al. | |
| 2017/0339072 A1 | 11/2017 | Pignataro et al. | |
| 2017/0359252 A1 | 12/2017 | Kumar et al. | |
| 2018/0052902 A1 | 2/2018 | Leiseboer et al. | |
| 2018/0091420 A1 | 3/2018 | Drake et al. | |
| 2018/0189369 A1* | 7/2018 | Baek | G06F 16/27 |
| 2018/0198717 A1 | 7/2018 | Khasnabish et al. | |
| 2018/0227221 A1 | 8/2018 | Starsinic et al. | |
| 2018/0227226 A1 | 8/2018 | Lu et al. | |
| 2018/0227364 A1 | 8/2018 | Xu et al. | |
| 2018/0270113 A1 | 9/2018 | Nainar et al. | |
| 2018/0331951 A1 | 11/2018 | Boutros et al. | |

\* cited by examiner

CONSISTENT PROCESSING OF TRANSPORT NODE NETWORK DATA IN A PHYSICAL SHARDING ARCHITECTURE

RELATED APPLICATIONS

The present patent is a continuation of, and hereby claims priority under 35 U.S.C § 120 to pending U.S. patent application Ser. No. 15/422,905, entitled "CONSISTENT PROCESSING OF TRANSPORT NODE NETWORK DATA IN A PHYSICAL SHARDING ARCHITECTURE," by the same inventors, filed on 2 Feb. 2017.

BACKGROUND

Software defined networking (SDN) comprises a plurality of hosts in communication over a physical network infrastructure, each host having one or more virtualized endpoints such as VMs or containers that are connected to one another over logical overlay networks that are decoupled from the underlying physical network infrastructure. One common characteristic of software defined networking is a separation of the control plane from the data plane. Control planes in a network are concerned with determining the logical overlay network topology and maintaining information about network entities such as logical switches, logical routers, and virtualized endpoints, etc. The logical topology information is translated by the control plane into network configuration data, such as forwarding table entries to populate forwarding tables at the virtual switches at each host. In large data centers having hundreds or thousands of hosts and/or logical networks, the processing and communication requirements are such that a single computer system is incapable of performing all the necessary tasks for all the hosts and networks. To address this problem various techniques for scaling out the control plane have been implemented. For example, to distribute some of the processing load to the hosts, the control plane may be divided into a central control plane (CCP) as well as local control planes (LCP) at each host.

Sharding is a mechanism used to provide high scalability and availability of a CCP by identifying "master" nodes among a plurality of nodes within the CCP for handling data from particular sources or of particular types. One type of sharding is logical sharding, which typically involves assigning (e.g., using a hash algorithm to determine an assignment of) one node of a CCP (also referred to as a CCP node) as the logical master of each specific logical network entity, such as a logical switch or logical router, in the network. The hash algorithm may be based on hashing of unique logical entity identifiers, and the assignments may be determined by one or more CCP nodes and shared by all CCP nodes in the form of a sharding table, which may comprise a table including logical entity identifiers and CCP node identifiers. The sharding table may also be published to a plurality of transport nodes (e.g., hosts), which may comprise physical or virtual devices, such as hypervisors running on host machines, configured to implement logical entities. The transport nodes may use the sharding table to determine which CCP node is the master of a given logical entity. A logical entity reports network configuration data only to the CCP node which is its logical master, and the CCP node stores this network configuration data and provides it to other logical entities for which it is the logical master, as well as to transport nodes.

While logical sharding works well in many instances, it can raise heretofore-unrecognized problems in certain corner cases. A first corner case can occur when a sharding change results in two logical entities being reassigned from an old logical master to a new logical master. Such a sharding change can occur, for example, when a node is added or removed from the CCP cluster. There may be a brief interval where the first logical entity has not yet connected to the new logical master, and so the new logical master has not yet received network configuration data from the first logical entity. If the second logical entity connects to the new logical master during this interval, the new logical master will not have a complete set of relevant network configuration data to provide to the second logical entity. This may affect existing traffic, as the new logical master and the second logical entity will have an incomplete set of network configuration data until the first logical entity connects to the new logical master.

A second corner case is when a first and second logical entity have both been reassigned from an old logical master to a new logical master, but only the first logical entity has received the change and moved to the new logical master. The first logical entity will have sent a flush message to the old master upon disconnecting, and so the old logical master will have deleted the network configuration data from the first logical entity. As a result, the second logical entity will not have access to the network configuration data from the first logical entity until it becomes aware of its master change and moves to the new logical master.

A third corner case can occur when a new logical entity joins the network during the interval between the time that a sharding change occurs and the time when all logical entities have moved to their new logical master. In this case, the new logical entity cannot get a full picture of all of the relevant network configuration data from either the old logical master or the new logical master until all logical entities have completely moved to their new logical master.

Each of these corner cases, though rare, can result in traffic flapping, which means that two or more alternating versions of network configuration data may be published by a CCP node. Because of this, transport nodes may be unable to appropriately report or receive all relevant network configuration data about logical entities during a sharding change. Consequently, a sharding mechanism is needed which will allow for consistent processing of network configuration data during sharding changes.

SUMMARY

Herein described are one or more embodiments of a method for consistent processing of transport node network configuration data in a physical sharding architecture. The method includes determining, by a first central control plane (CCP) node of a plurality of CCP nodes, a sharding table, wherein the sharding table is shared by the plurality of CCP nodes. The method further includes determining, by the first CCP node, a connection establishment between a first transport node and the first CCP node. The method further includes determining, by the first CCP node and based on the sharding table, whether the first CCP node is a physical master of the first transport node. Upon determining, by the first CCP node, that the first CCP node is the physical master of the first transport node, the method further includes receiving, at the first CCP node, network configuration data from the first transport node, storing, by the first CCP node, at least a portion of the network configuration data, and transmitting, by the first CCP node, a data update comprising at least a portion of the network configuration data to a shared data store. The shared data store may be accessible by each of the plurality of CCP nodes.

Also described herein are embodiments of a non-transitory computer readable medium comprising instructions to be executed in a computer system, wherein the instructions when executed in the computer system perform a method described above for consistent processing of transport node network configuration data in a physical sharding architecture.

Also described herein are embodiments of a computer system, wherein software for the computer system is programmed to execute the method described above for consistent processing of transport node network configuration data in a physical sharding architecture.

DETAILED DESCRIPTION

Embodiments presented herein relate to consistent processing of transport node network configuration data in a physical sharding architecture. For example, in some embodiments, network configuration data may be passed in the form of packets between transport nodes and Central Control Plane (CCP) nodes according to master roles determined based on a sharding table. CCP nodes may store network configuration data received from transport nodes in local storage, such as a data cache. CCP nodes may transmit data updates based on the network configuration data to a shared data store, such as a database or repository. The network may, for example, be implemented as a logical network (e.g. a software defined network) or physical network, and nodes may be implemented as software or hardware entities.

Figure 1:
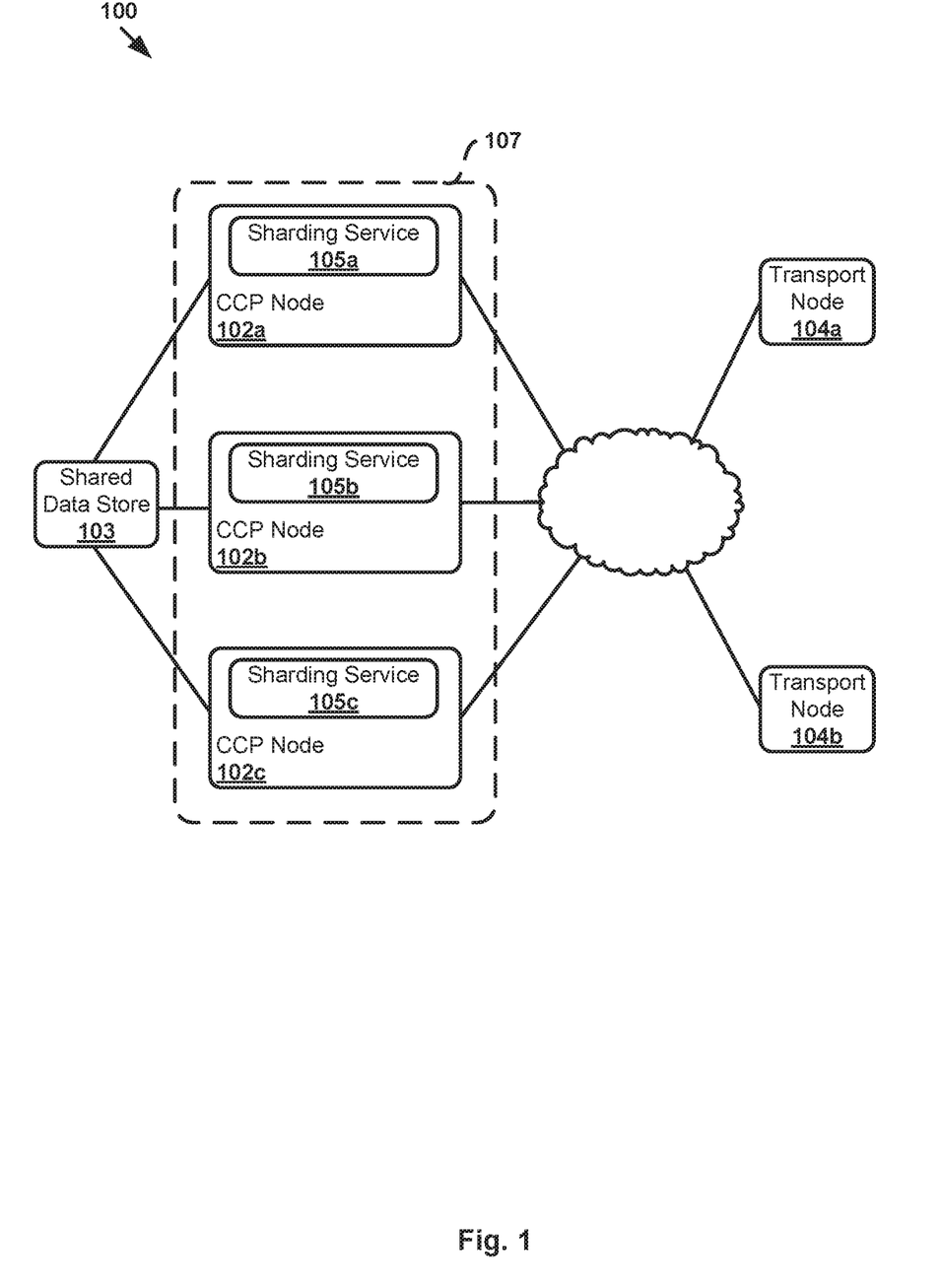
FIG. 1 is a block diagram of a network in which one or more embodiments of a method for consistent processing of transport node network configuration data in a physical sharding architecture may be implemented.

FIG. 1 is a block diagram of a network 100 in which one or more embodiments of a method for consistent processing of transport node network configuration data in a physical sharding architecture may be implemented. It should be understood that network 100 may include additional and/or alternative components than that shown, depending on the desired implementation. Network 100 includes CCP cluster 107, which comprises one or more CCP nodes 102. A CCP node (e.g., CCP node 102) may refer generally to a controller within a "central control plane" of a network which receives and handles packets from other network entities. In practice, the "central control plane" may be implemented as CCP cluster 107, which comprises a cluster of three CCP nodes 102a-102c as shown. CCP nodes 102 may be implemented as a plurality of controller computers, virtual machines, or containers (or other logical compute instances) that implement central control plane functions. One or more of CCP nodes 102 may comprise a sharding service 105, which determines physical master roles for CCP nodes 102 with respect to transport nodes 104. Sharding service 105 may, for example, determine physical master roles based on a hash algorithm, and may produce a sharding table which is shared by all of CCP nodes 102.

Network 100 further includes a shared data store 103 which is accessible by CCP nodes 102. Shared data store 103 may comprise a database, repository, file server, or other physical storage entity. Shared data store 103 is configured to allow each of CCP nodes 102 to both store and retrieve data.

Network 100 further includes one or more transport nodes 104. A transport node 104 may comprise, for example, a physical host computer system, and may host a plurality of logical entities.

As discussed, the sharding service 105 of each CCP node 102 may determine (e.g., calculate) a sharding table. CCP nodes 102 may use the sharding table to determine who has the physical master role with respect to each of transport nodes 104. A physical master role may differ from a logical master role. For example, in a physical master role, a single CCP node 102 is the master of any given transport node 104, meaning for any logical entity implemented by transport node 104, network configuration data is received from a single CCP node 102. This is different from a logical master role, in which each logical entity implemented by a transport node 104 is assigned a single CCP node 102 as its physical master, and so transport node 104 would receive network configuration data from potentially different CCP nodes 102 for different logical entities. Each CCP node 102 may be the physical master of more than one transport node 104, handle all network configuration data from the one or more transport nodes 104 for which it is the physical master, and store this network configuration data in local storage, such as a local data cache. A transport node 104 may determine which CCP node 102 is its physical master by connecting to any CCP node 102, as all of the CCP nodes 102 are aware of the physical master for each transport node 104, as described with respect to FIG. 2.

The term "layer-2" generally refers to a data link layer (e.g., Media Access Control (MAC) or Ethernet layer), "layer-3" to a network layer (e.g., Internet Protocol (IP) layer), and "layer-4" to a transport layer (e.g., Transmission Control Protocol (TCP) layer) in the Open System Interconnection (OSI) model, although the concepts described herein and referred to simply as "MAC" and "IP" may be applicable to corresponding layers in other networking models. The term "packet" may refer generally to a group of bits that can be transported together, and may be in another form, such as "frame", "message", "segment", etc. In some embodiments, the packet may include a payload (e.g., data) and header information, such as a source MAC address corresponding to the MAC address of the node that generated the packet, a source port corresponding to the port of the node that generated the packet, a destination MAC address corresponding to the MAC address of the destination node, a destination port corresponding to the port of the destination node, and/or a protocol used for the packet.

A "full sync" of network configuration data between a transport node 104 and a CCP node 102 may involve transport node 104 providing all of its network configuration data to CCP node 102, and CCP node 102 providing to transport node 104 the locally stored network configuration data it has received from all of the transport nodes 104 for which it is the physical master. Once a full sync has been performed, additional or modified network configuration data is generally sent in the form of data updates.

A particular transport node 104 may exchange network configuration data in the form of packets with the CCP node 102 which is its physical master. The network configuration data may, for example, comprise MAC data (e.g., layer-2 data including a header and MAC addresses which are to be used by a VM or a container on a host to connect to a logical layer-2 network), VXLAN tunnel endpoint (VTEP) data (e.g., IP address, segment, and MAC data to be used by the host to build overlay tunnels for a VM), Address Resolution Protocol (ARP) data (e.g., IP address to MAC address mapping information in the logical layer-2 network for a VM running on a host), or Virtual Host Interface (VIF) data (e.g., information identifying a VM's port for connecting to a logical switch) of transport node 104. These types of data are merely exemplary, and many other types of data may be included in network configuration data. The CCP node 102 which receives the network configuration data may store the network configuration data in local storage such as a data cache. If CCP node 102 already has an earlier version of the received network configuration data stored, CCP node 102 may determine a "delta update" by comparing the two versions of the network configuration data, and then write the delta update corresponding to the difference between the two versions of the network configuration data to its local storage. In some embodiments, if the CCP node 102 is the master of the particular transport node, the CCP node 102 also provides the updated network configuration data to the shared data store 103.

A "sharding change" may occur when an updated sharding table is determined by sharding service 105. This may occur as the result of network changes such as node failures, changes in traffic patterns, bottlenecks, new nodes joining the network, etc. For example, a sharding change may result in the physical master for a particular transport node 104 changing from one CCP node 102 to another.

Figure 2:
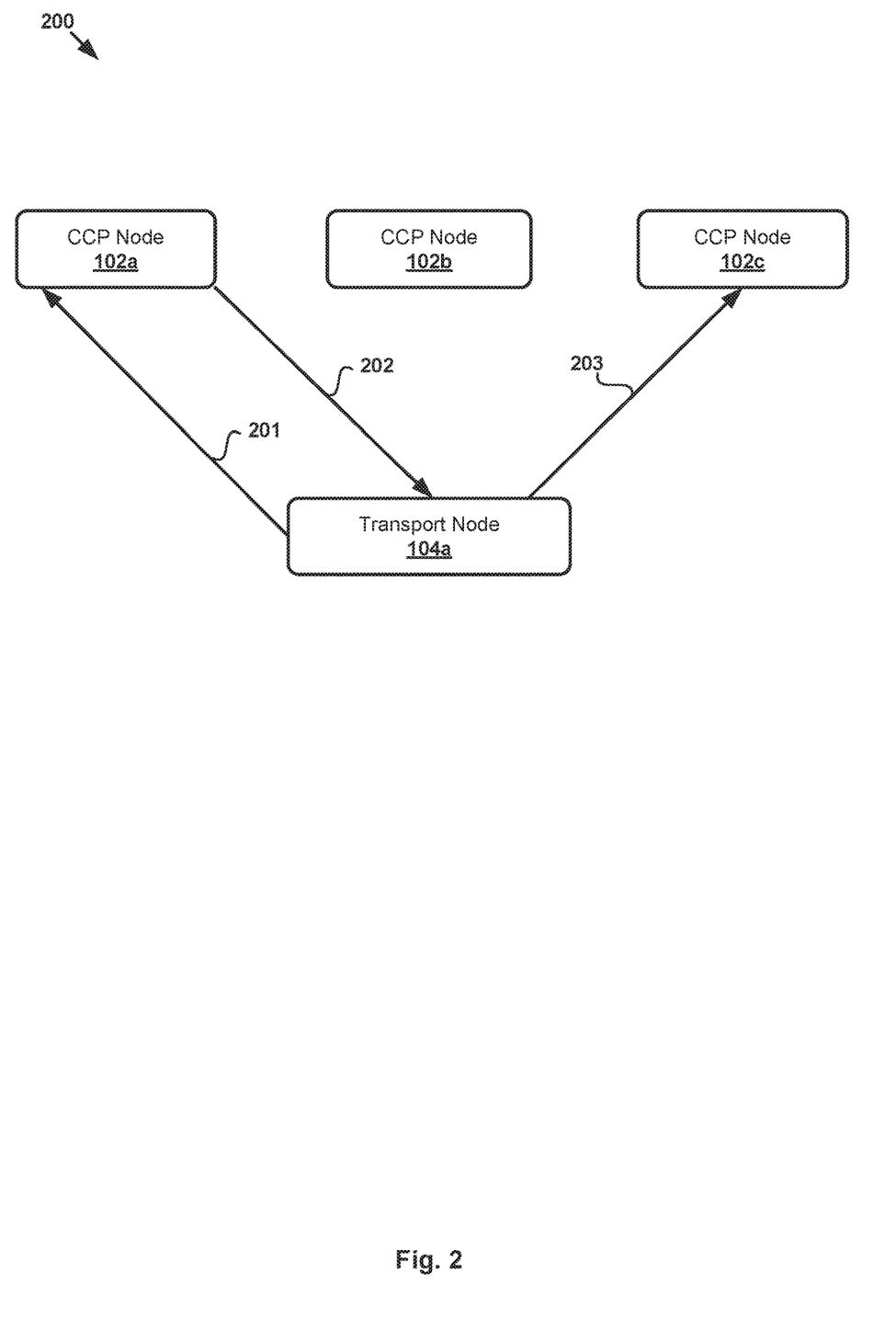
FIG. 2 is a block diagram of an onboarding process for a transport node in the network of FIG. 1.

FIG. 2 is a block diagram illustrating an onboarding process for a transport node 104 in network 100 of FIG. 1. Specifically, as shown, onboarding process 200 includes transport node 104a, CCP node 102a, CCP node 102b, and CCP node 102c. Transport node 104a and CCP nodes 102 may be implemented as described above with respect to FIG. 1.

At 201, transport node 104a connects to CCP node 102a. It is not necessary at this point for transport node 104a to know which CCP node 102 is its physical master. The connection may, for example, be the result of a random selection by transport node 104a of which CCP node 102 with which to establish a connection. CCP node 102a then determines whether it is the physical master of transport node 104a.

At 202, CCP node 102a has determined that it is not the physical master of transport node 104a, and it notifies transport node 104a of its actual physical master. For example, CCP node 102a may determine, based on the sharding table, that CCP node 102c is the physical master of transport node 104a, and notifies transport node 104a accordingly. Then CCP node 102a disconnects from transport node 104a. If, alternatively, CCP node 102a had determined that it was the physical master of transport node 104a, it would have remained connected and accepted network configuration data from transport node 104a. This allows for transport node 104a to determine its physical master without using the sharding table.

At 203, transport node 104a connects to its physical master, CCP node 102c, based on the notification from CCP node 102a. At this point CCP node 102c verifies, using the sharding table, that it is the physical master of transport node 104a. Transport node 104a then performs a full sync of network configuration data with CCP node 102c.

At this point, with transport node 104a being connected to its physical master, operations continue with transport node 104a providing network configuration data updates to CCP node 102c, and CCP node 102c handling the network configuration data by locally storing delta updates and, as described below with respect to FIG. 3, sending updates to shared data store 103.

Figure 3:
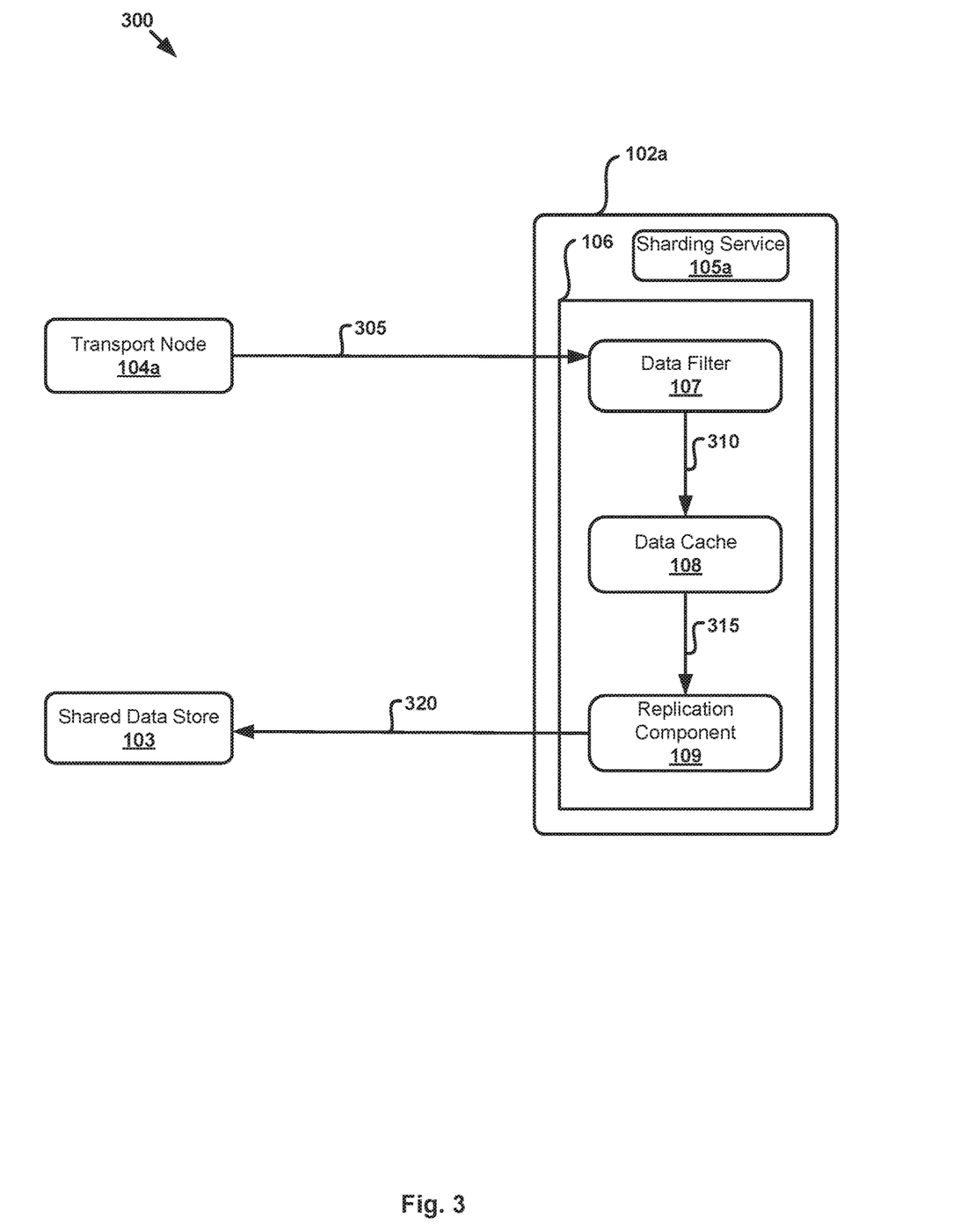
FIG. 3 is a block diagram of a process for handling network configuration data updates from a transport node of FIG. 1.

FIG. 3 illustrates a process 300 for handling network configuration data updates from a transport node, such as transport node 104a, by a CCP node, such as CCP node 102a. Each CCP node, such as CCP node 102a may include a replication service 106, which may comprise a data filter 107, a data cache 108, and a replication component 109. Replication service 106, including its subcomponents identified above, may be implemented as either hardware or software. While CCP node 102a is depicted, these components may be included in any of the CCP nodes 102.

At 305, transport node 104a sends a network configuration data update to CCP node 102a, and the update is received by data filter 107 of replication service 106. Data filter 107 then determines whether CCP node 102a is the physical master of transport node 104a. If CCP node 102a is not the physical master of transport node 104a, then data filter 107 discards the network configuration data update. If CCP node 102a is the physical master of transport node 104a, then data filter 107 handles the update and determines whether the update requires any changes to the locally stored network configuration data in data cache 108 by comparing the update to the stored network configuration data.

At 310, data filter 107 stores a delta update in the local data cache 108, the delta update comprising any changes to the locally stored network configuration data based on the received network configuration data update. If the network configuration data in the data cache 108 is already in the same state as that in the network configuration data update, then no delta update is required, and no update is sent to replication component 109 as discussed.

At 315, data cache 108 forwards a notification of the update to replication component 109. The notification may comprise an indication that data cache 108 has been updated and the updated network configuration data.

At 320, replication component 109 provides the update to shared data store 103. The update may comprise an author field which indicates the CCP node 102 which provided the update. In this case, the author field would indicate that CCP node 102a provided the update. Shared data store 103 is accessible to all CCP nodes 102, and may provide updates to all CCP nodes 102 when it receives an update.

Figure 4:
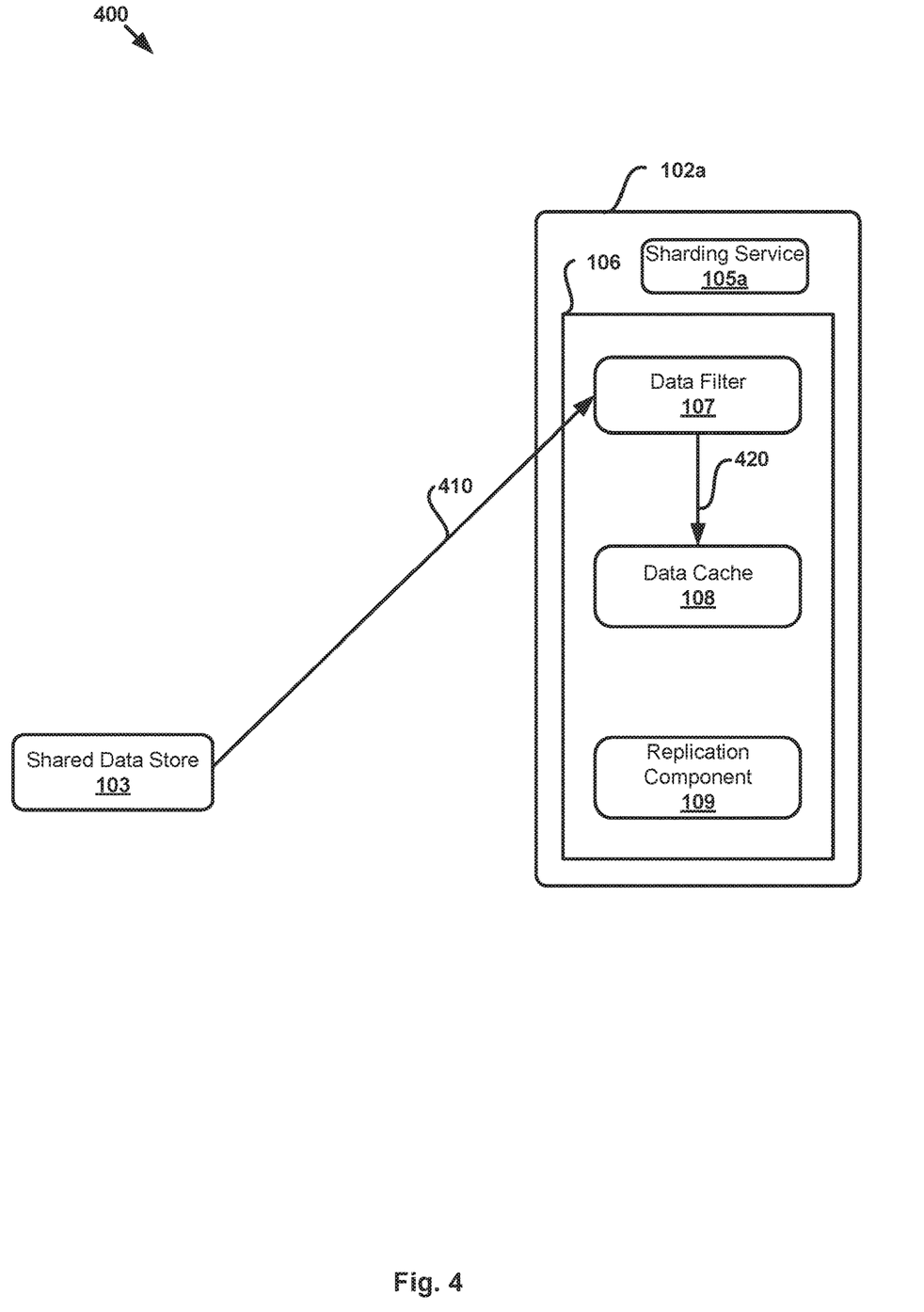
FIG. 4 is a block diagram of a process for updates from the shared data store of FIG. 1.

FIG. 4 illustrates a process 400 for handling updates from shared data store 103 by a CCP node, such as CCP node 102a. While CCP node 102a is depicted, the update may be provided to all CCP nodes 102.

At 410, shared data store 103 provides an update to CCP node 102a. The update may be triggered by shared data store 102 receiving an update from a CCP node 102, and may include an author field indicating which CCP node 102 provided the update to shared data store 103 as well as an indication of which transport node 104 to which the update relates. The update is received by data filter 107 of replication service 106. Data filter 107 may verify that CCP node 102a is the physical master of the transport node 104 to which the update relates.

At 420, if CCP node 102a is not the physical master of the transport node 104 to which the update relates, data filter 107 provides a delta update to data cache 108. Because CCP node 102a is not the physical master of the transport node 104 to which the update relates, and because the update comes from shared data store 103, the update may not be provided to replication component 109 or forwarded to shared data store 103.

If data filter 107 determines that CCP node 102a is the physical master of the transport node 104 to which the update relates, data filter 107 may further use the author field to determine whether CCP node 102a originally wrote this update to shared data store 103. If CCP node 102a originally wrote this update to shared data store, the update may be discarded, as CCP node 102a has already handled this update. If CCP node 102a did not originally write this update to shared data store, this may indicate a problem situation in which two different CCP nodes 102 believe themselves to be the physical master of the transport node 104 to which the update relates. In this case, data filter 107 may further check to see if the transport node 104 to which the update relates is connected to CCP node 102a. If the transport node 104 to which the update relates is connected to CCP node 102a, then CCP node 102a is likely the true physical master, and data filter 107 rejects the update and notifies replication component 109 to overwrite the shared data store 103 with the locally stored version of the network configuration data from data cache 108. If, on the other hand, the transport node 104 to which the update relates is not connected to CCP node 102a, then CCP node 102a is likely not the true physical master, and data filter 107 forwards the delta update to data cache 108 and may not attempt to write anything to shared data store 103.

Figure 5:
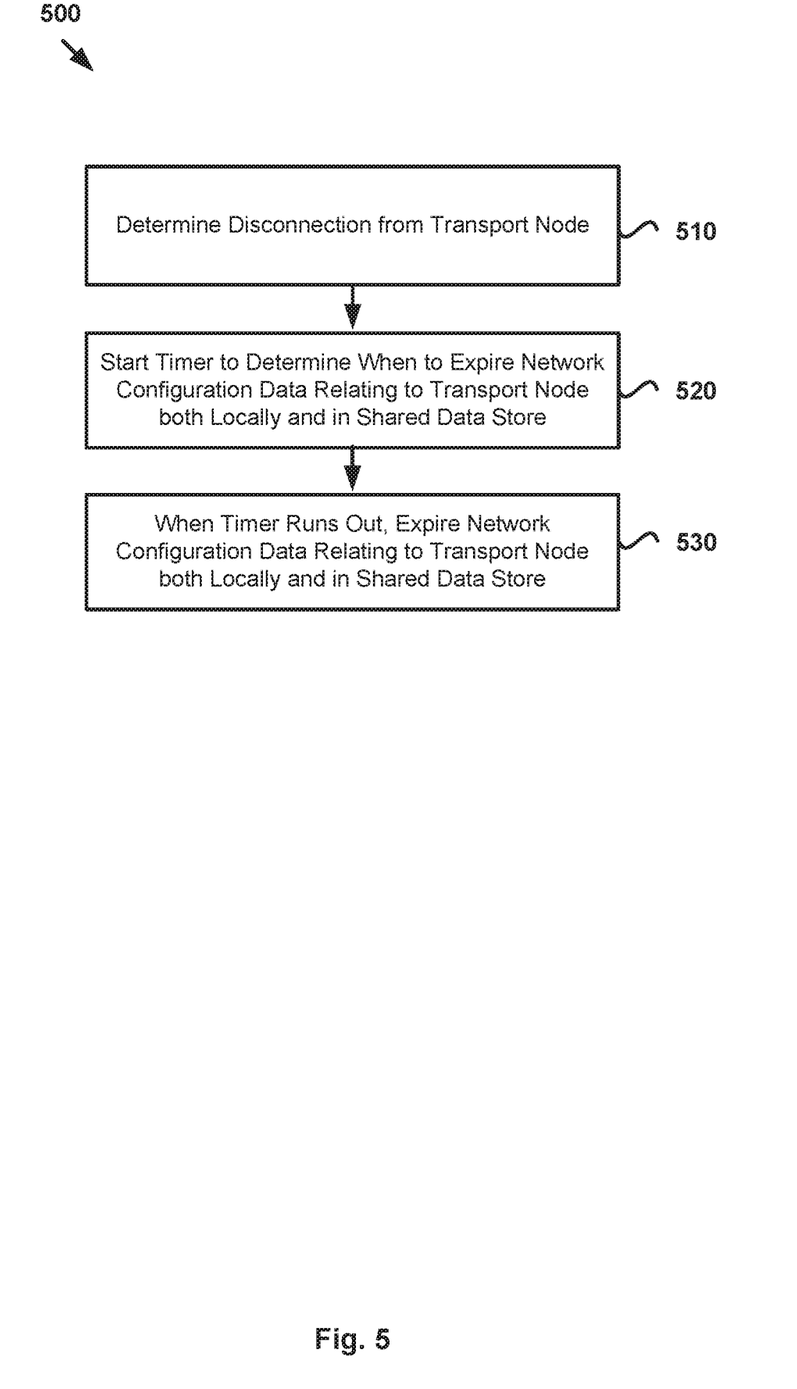
FIG. 5 illustrates example operations for using a timer after detecting a disconnection from a transport node to determine when to expire network configuration data received from a transport node which is stored locally and in the shared data store.

FIG. 5 illustrates example operations for using a timer after detecting a disconnection from a transport node to determine when to expire network configuration data received from a transport node 104 which is stored locally and in the shared data store 103. The operations may be implemented, for example, by a CCP node 102, and may ensure that the CCP node 102 does not rely upon stale network configuration data.

At 510, a CCP node 102 determines that transport node 104a, of which the CCP node 102 is the physical master, has disconnected from the CCP node 102.

At 520, the CCP node 102 initiates a timer to determine when to expire network configuration data relating to transport node 104a both in the data cache 108 of transport node 104a and the shared data store 103. This is because there may be a delay before transport node 104a reconnects to the CCP node 102, and the network configuration data for transport node 104a may become stale. If the transport node 104a reestablishes its connection with the CCP node 102, the timer may be canceled.

At 530, when the timer runs out, the network configuration data in data cache 108 and shared data store 103 which relates to transport node 104a is considered expired. The data may, for instance, be deleted.

Figure 6:
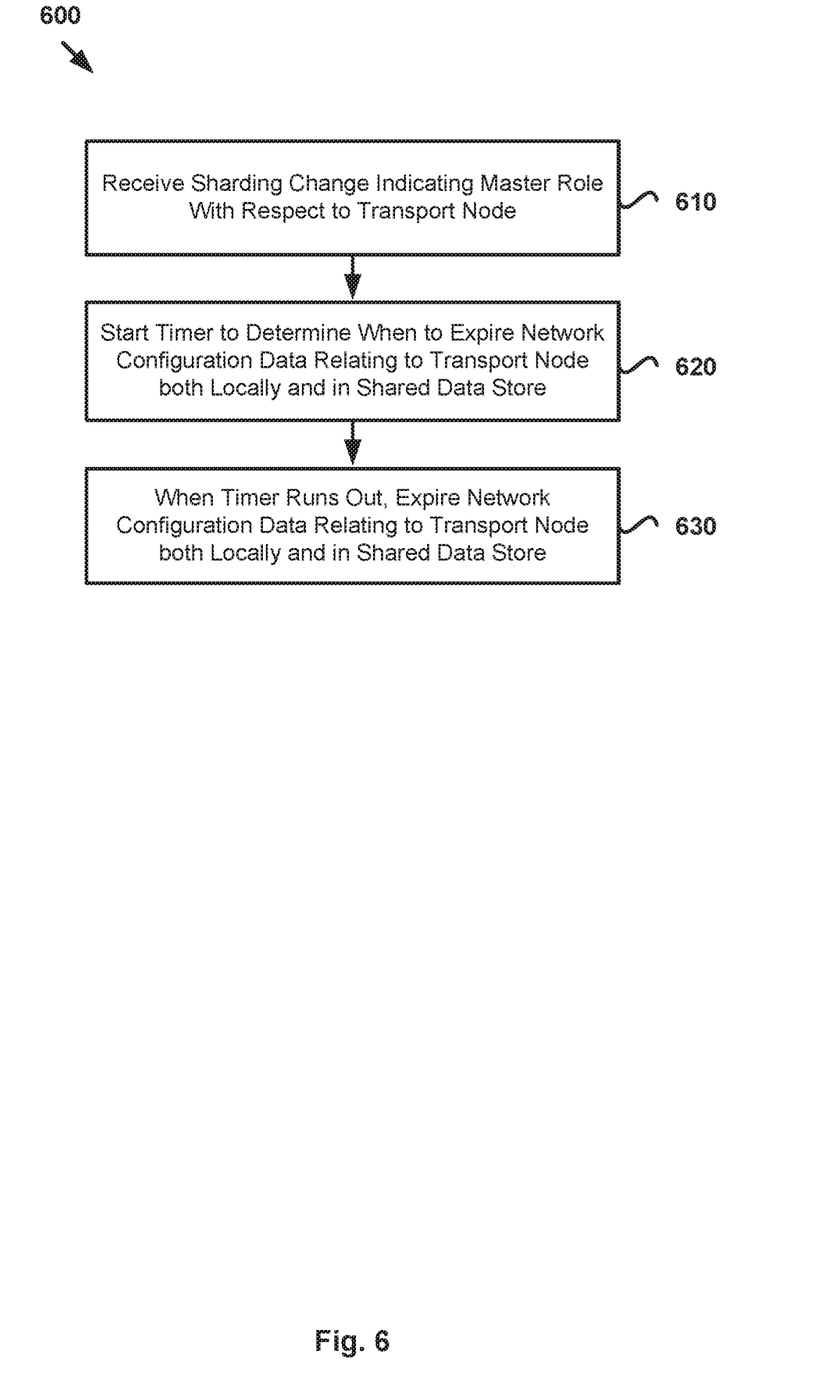
FIG. 6 illustrates example operations for using a timer after a sharding change to determine when to expire data from the shared data store relating to a newly assigned transport node.

FIG. 6 illustrates example operations for using a timer after a sharding change to determine when to expire network configuration data from shared data store 103 which relates to a newly-assigned transport node 104. The operations may be implemented, for example, by a CCP node 102 which has just been assigned as the logical master of transport node 104a.

At 610, a CCP node 102 receives a sharding change indicating that the CCP node 102 is now the physical master of transport node 104a.

At 620, the CCP node 102 initiates a timer to determine when to expire data from shared data store 103 which relates to transport node 104a. This is because there may be a delay before transport node 104a connects to its new physical master and provides new updates. The timer ensures that stale network configuration data is not relied upon. If another sharding change results in the CCP node 102 no longer being the physical master of transport node 104a before the timer is up, the timer may be canceled.

At 630, when the timer runs out, the data from shared data store 103 which relates to transport node 104a will be considered expired. The data may, for instance, be deleted both from data cache 108 and shared data store 103.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present application. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for consistent processing of transport node network configuration data in a physical sharding architecture, the transport node network configuration data including configuration information for a logical entity implemented by a first transport node and a second transport node, comprising:

receiving, at a first central control plane (CCP) node, network configuration data from the first transport node relating to the logical entity;

determining, by the first CCP node and based on a sharding table, that the first CCP node is a physical master of the first transport node, wherein each of the first transport node and the second transport node comprises a physical host computer system;

based on the determining that the first CCP node is the physical master of the first transport node, storing, by the first CCP node, at least a portion of the network configuration data; and based upon the determining that the first CCP node is the physical master of the first transport node, transmitting, by the first CCP node, a data update comprising the at least a portion of the network configuration data to a shared data store, wherein the shared data store is accessible by each of a plurality of CCP nodes; and when receiving, by the first CCP node, additional network configuration data from the second transport node relating to the logical entity:

determining, by the first CCP node and based on the sharding table, that the first CCP node is not a physical master of the second transport node; and based on the determining that the first CCP node is not the physical master of the second transport node, discarding, by the first CCP node, the additional network configuration data.

2. The method of claim 1, further comprising:

based on the determining that the first CCP node is not the physical master of the second transport node, and based on determining that a second CCP node of the plurality of CCP nodes is the physical master of the second transport node:

transmitting, by the first CCP node, a notification to the second transport node that the second CCP node is the physical master of the second transport node; and disconnecting, by the first CCP node, from the second transport node, wherein the second transport node connects to the second CCP node.

3. The method of claim 1, further comprising:

determining, by the first CCP node, an updated sharding table;

determining, by the first CCP node and based on the updated sharding table, whether the first CCP node is still the physical master of the first transport node;

upon determining, by the first CCP node, that the first CCP node is no longer the physical master of the first transport node, and that a second CCP node of the plurality of CCP nodes is now the physical master of the first transport node:

transmitting, by the first CCP node, a notification to the first transport node that the second CCP node is now the physical master of the first transport node; and disconnecting, by the first CCP node, from the first transport node, wherein the first transport node connects to the second CCP node.

4. The method of claim 3, further comprising:
receiving, by the second CCP node, network configuration data relating to the first transport node from the shared data store; and
upon determining, by the second CCP node and based on the updated sharding table, that the second CCP node is now the physical master of the first transport node:
activating, by the second CCP node, a timer which indicates an amount of time until the network configuration data relating to the first transport node should be expired.

5. The method of claim 1, wherein the receiving, by the first CCP node, the network configuration data from the first transport node is a result of a random selection by the first transport node of which CCP node to connect to.

6. The method of claim 1, further comprising:
determining a disconnection of a connection between the first transport node and the first CCP node; and
upon determining, by the first CCP node, that the first transport node has disconnected from the first CCP node, activating, by the first CCP node, a timer which indicates an amount of time until the network configuration data should be expired.

7. The method of claim 1, wherein the data update comprises an author field indicating that the data update comes from the first CCP node.

8. A non-transitory computer readable medium comprising instructions to be executed in a computer system, wherein the instructions when executed in the computer system perform a method for consistent processing of transport node network configuration data in a physical sharding architecture, the transport node network configuration data including configuration information for a logical entity implemented by a first transport node and a second transport node, the method comprising:
receiving, at a first central control plane (CCP) node, network configuration data from the first transport node relating to the logical entity;
determining, by the first CCP node and based on a sharding table, that the first CCP node is a physical master of the first transport node, wherein each of the first transport node and the second transport node comprise a physical host computer system;
based upon the determining that the first CCP node is the physical master of the first transport node, storing, by the first CCP node, at least a portion of the network configuration data; and
based on the determining that the first CCP node is the physical master of the first transport node, transmitting, by the first CCP node, a data update comprising at least a portion of the network configuration data to a shared data store, wherein the shared data store is accessible by each of a plurality of CCP nodes; and
when receiving, by the first CCP node, additional network configuration data from the second transport node relating to the logical entity:
determining, by the first CCP node and based on the sharding table, that the first CCP node is not a physical master of the second transport node; and
based on the determining that the first CCP node is not the physical master of the second transport node, discarding, by the first CCP node, the additional network configuration data.

9. The non-transitory computer readable medium of claim 8, wherein the method further comprises:
based on the determining that the first CCP node is not the physical master of the second transport node, and based on determining that a second CCP node of the plurality of CCP nodes is the physical master of the second transport node:
transmitting, by the first CCP node, a notification to the second transport node that the second CCP node is the physical master of the second transport node; and
disconnecting, by the first CCP node, from the second transport node, wherein the second transport node connects to the second CCP node.

10. The non-transitory computer readable medium of claim 8, wherein the method further comprises:
determining, by the first CCP node, an updated sharding table;
determining, by the first CCP node and based on the updated sharding table, whether the first CCP node is still the physical master of the first transport node;
upon determining, by the first CCP node, that the first CCP node is no longer the physical master of the first transport node, and that a second CCP node of the plurality of CCP nodes is now the physical master of the first transport node:
transmitting, by the first CCP node, a notification to the first transport node that the second CCP node is now the physical master of the first transport node; and
disconnecting, by the first CCP node, from the first transport node, wherein the first transport node connects to the second CCP node.

11. The non-transitory computer readable medium of claim 10, wherein the method further comprises:
receiving, by the second CCP node, network configuration data relating to the first transport node from the shared data store; and
upon determining, by the second CCP node and based on the updated sharding table, that the second CCP node is now the physical master of the first transport node:
activating, by the second CCP node, a timer which indicates an amount of time until the network configuration data relating to the first transport node should be expired.

12. The non-transitory computer readable medium of claim 8, wherein the receiving, by the first CCP node, the network configuration data from the first transport node is a result of a random selection by the first transport node of which CCP node to connect to.

13. The non-transitory computer readable medium of claim 8, wherein the method further comprises:
determining a disconnection of a connection between the first transport node and the first CCP node; and
upon determining, by the first CCP node, that the first transport node has disconnected from the first CCP node, activating, by the first CCP node, a timer which indicates an amount of time until the network configuration data should be expired.

14. The non-transitory computer readable medium of claim 8, wherein the data update comprises an author field indicating that the data update comes from the first CCP node.

15. A computer system comprising one or more processors, wherein system software for the computer system, when executed by the one or more processors, causes the computer system to perform a method for consistent processing of transport node network configuration data in a physical sharding architecture, the transport node network configuration data including configuration information for a logical entity implemented by a first transport node and a second transport node, the method comprising:

receiving, at a first central control plane (CCP) node, network configuration data from the first transport node relating to the logical entity;

determining, by the first CCP node and based on a sharding table, that the first CCP node is a physical master of the first transport node, wherein eh of the first transport node and the second transport node comprises a physical host computer system;

based, upon the determining that the first CCP node is the physical master of the first transport node, storing, by the first CCP node, at least a portion of the network configuration data; and based on the determining that the first CCP node is the physical master of the first transport node, transmitting, by the first CCP node, a data update comprising the at least a portion of the network configuration data to a shared data store, wherein the shared data store is accessible by each of a plurality of CCP nodes; and when receiving, by the first CCP node, additional network configuration data from the second transport node relating, to the logical entity:

determining, by the first CCP node and based on the sharding table, that the first CCP node is not a physical master of the second transport node; and based on the determining that the first CP node is not the physical master of the second transport node, discarding, by the first CCP node, the additional network configuration data.

16. The computer system of claim 15, wherein the method further comprises:

based on the determining that the first CCP node is not the physical master of the second transport node, and based on determining that a second CCP node of the plurality of CCP nodes is the physical master of the second transport node:

transmitting, by the first CCP node, a notification to the second transport node that the second CCP node is the physical master of the second transport node; and disconnecting, by the first CCP node, from the second transport node, wherein the second transport node connects to the second CCP node.

17. The computer system of claim 15, wherein the method further comprises:

determining, by the first CCP node, an updated sharding table;

determining, by the first CCP node and based on the updated sharding table, whether the first CCP node is still the physical master of the first transport node;

upon determining, by the first CCP node, that the first CCP node is no longer the physical master of the first transport node, and that a second CCP node of the plurality of CCP nodes is now the physical master of the first transport node:

transmitting, by the first CCP node, a notification to the first transport node that the second CCP node is now the physical master of the first transport node; and disconnecting, by the first CCP node, from the first transport node, wherein the first transport node connects to the second CCP node.

18. The computer system of claim 17, wherein the method further comprises:

receiving, by the second CCP node, network configuration data relating to the first transport node from the shared data store; and upon determining, by the second CCP node and based on the updated sharding table, that the second CCP node is now the physical master of the first transport node:

activating, by the second CCP node, a timer which indicates an amount of time until the network configuration data relating to the first transport node should be expired.

19. The computer system of claim 15, wherein the receiving, by the first CCP node, the network configuration data from the first transport node is a result of a random selection by the first transport node of which CCP node to connect to.

20. The computer system of claim 15, wherein the method further comprises:

determining a disconnection of a connection between the first transport node and the first CCP node; and upon determining, by the first CCP node, that the first transport node has disconnected from the first CCP node, activating, by the first CCP node, a timer which indicates an amount of time until the network configuration data should be expired.

21. The computer system of claim 15, wherein the data update comprises an author field indicating that the data update comes from the first CCP node.

* * * * *